(12) United States Patent
Sun et al.

(10) Patent No.: US 8,522,692 B2
(45) Date of Patent: Sep. 3, 2013

(54) SLEEPER COMPARTMENT OF A RAILROAD PASSENGER CAR

(75) Inventors: Bangcheng Sun, Hebei (CN); Chao An, Hebei (CN); Shunyin Cai, Hebei (CN); Huijun Liu, Hebei (CN)

(73) Assignee: Tangshan Railway Vehicle Co., Ltd., Hebei (CN)

( * ) Notice: Subject to any disclaimer, the term of this patent is extended or adjusted under 35 U.S.C. 154(b) by 149 days.

(21) Appl. No.: 13/172,817

(22) Filed: Jun. 29, 2011

(65) Prior Publication Data

US 2011/0253005 A1    Oct. 20, 2011

Related U.S. Application Data

(63) Continuation of application No. PCT/CN2010/074786, filed on Jun. 30, 2010.

(30) Foreign Application Priority Data

Sep. 24, 2009 (CN) ...................... 2009 2 0217162 U

(51) Int. Cl.
*B60N 5/00* (2006.01)

(52) U.S. Cl.
USPC .......................................... 105/315; 105/316

(58) Field of Classification Search
USPC .................................................. 105/314–319
See application file for complete search history.

(56) References Cited

U.S. PATENT DOCUMENTS

| | | | | |
|---|---|---|---|---|
| 2,583,960 A | * | 1/1952 | Murphy | 105/315 |
| 2,599,606 A | * | 6/1952 | Burgess | 105/315 |
| 2,612,121 A | * | 9/1952 | Kuhler et al. | 105/340 |
| 2,953,103 A | * | 9/1960 | Bohannon et al. | 105/315 |
| 2,983,230 A | * | 5/1961 | Murphy | 105/315 |
| 2,995,095 A | * | 8/1961 | Murphy | 105/315 |

(Continued)

FOREIGN PATENT DOCUMENTS

| CN | 2233345 | 8/1996 |
|---|---|---|
| CN | 2371085 | 3/2000 |
| CN | 201484417 | 5/2010 |
| JP | 2001-63566 | 3/2001 |

OTHER PUBLICATIONS

International Search Report of International Application PCT/CN2010/074786, dated Oct. 8, 2010.

(Continued)

*Primary Examiner* — Jason C Smith
(74) *Attorney, Agent, or Firm* — J.C. Patents

(57) ABSTRACT

The present invention relates to the technical field of railroad passenger car, and more particularly relates to a sleeper compartment of a railroad passenger car. The sleeper compartment may be an open type or a private booth type, comprising: sidewalls, partition walls, and two columns of longitudinally arranged sleepers that are parallel with each other; each column of the longitudinally arranged sleepers is formed by no less than two sleepers that are joined together, the sleepers comprise an upper-sleeper layer and a lower-sleeper layer; one partition wall is provided between adjacent sleepers; the length direction of the longitudinally arranged sleepers is consistent with the length direction of the railroad passenger car; the longitudinally arranged sleepers at two sides are fixed to the sidewalls respectively, and a corridor is provided between two adjacent columns of longitudinally arranged sleepers. The weight of the sleeper compartment of a railroad passenger car in this structure is evenly distributed, and passengers have better comfort when traveling.

9 Claims, 6 Drawing Sheets

(56) References Cited

U.S. PATENT DOCUMENTS

| | | | |
|---|---|---|---|
| 3,044,419 A * | 7/1962 | Majnoni | 105/315 |
| 4,018,166 A * | 4/1977 | Gutridge et al. | 105/316 |
| 4,138,949 A * | 2/1979 | Gutridge et al. | 105/315 |
| 4,161,914 A * | 7/1979 | Marsh | 105/344 |
| 4,589,612 A * | 5/1986 | Halim | 244/118.6 |
| 2011/0253005 A1 * | 10/2011 | Sun et al. | 105/315 |

OTHER PUBLICATIONS

The extended European Search Report in corresponding European Application No. 10 81 8325, dated Apr. 26, 2012.

* cited by examiner

SLEEPER COMPARTMENT OF A RAILROAD PASSENGER CAR

CROSS-REFERENCE TO RELATED APPLICATIONS

This application is a continuation of International Application No. PCT/CN2010/074786, filed on Jun. 30, 2010, which claims the priority benefit of China Patent Application No. 200920217162.5, filed on Sep. 24, 2009. The contents of the above identified applications are incorporated herein by reference in their entirety.

FIELD OF THE TECHNOLOGY

The present invention relates to the technical field of railroad passenger car, and more particularly, relates to a sleeper compartment of a railroad passenger car.

BACKGROUND OF THE INVENTION

A sleeper compartment of an existing railroad passenger car is categorized into hard sleeper compartment and soft sleeper compartment. Sleepers are mainly laid transversely along the passenger car body, namely, the length direction of the sleepers is vertical to the length direction of the passenger car body. Usually, one end of a sleeper is fixed on one sidewall of the compartment, and a long side of a sleeper is fixed on a partition wall with a corridor formed between the other end of the sleeper and the other sidewall of the compartment.

For a sleeper compartment of a railway passenger car in such structure, the weight on its transversal sides is unevenly distributed. It is an important factor affecting the operating stability of a railroad passenger car whether the weight distribution of a compartment is even, and uneven weight distribution for a passenger compartment will cause great security risk during the traveling process of the railroad passenger car.

In the prior art, in order to make the weight of a compartment of a railroad passenger car evenly distributed, the manner of adding balance weight is always employed, namely, adding a proper balance weight to the compartment at the side of the corridor. As a result, the deadweight of the railroad passenger car will increase, thereby increasing the dynamic load of the railroad passenger car.

For another example in the prior art, although the patent literature with the application number of 95242247.6, entitled "Railway Carriage with Longitudinally arranged sleeper" employs the manner of longitudinally arranged sleepers, its form is rather idle. Because there are no partition walls between sleepers, passengers are easily affected by each other. Although the back cushion portion of its sleeper is adjustable in a small range, it still adopts a reclining posture, and a passenger will still feel fatigue after a long while, thereby affecting personal space and comfort.

SUMMARY

An objective of the present invention is to provide a sleeper compartment of a railroad passenger car, which enables the compartment weight of the railroad passenger car to be evenly distributed, thereby improving the traveling stability of the car and satisfying passenger's comfort demands on reclining and sitting.

In order to achieve the above objective, present invention provides a sleeper compartment of a railroad passenger car. The sleeper compartment, which may be open, comprises sidewalls of the compartment, partition walls, and three longitudinally arranged sleepers that are arranged in parallel; each of the longitudinally arranged sleepers is formed by joining no less than two sleepers; moreover, each of the partition walls is spaced between two adjacent sleepers; the length direction of the longitudinally arranged sleeper is consistent with the length direction of the railway passenger car. The longitudinally arranged sleepers at two sides are fixed to the sidewalls respectively, and a corridor is arranged between two adjacent longitudinally arranged sleepers.

Preferably, a recess is provided in each of the partition walls close to the corridor side, inside the recess embedded rungs are provided.

Preferably, a fire extinguisher box and an electric boiler case are provided at an end of the longitudinally arranged sleeper, close to an end wall of the compartment, in the middle of the sleeper compartment.

Preferably, a sleeper head lamp is provided at a location inside each of the partition walls and close to the sleeper head, and an overturn handrail is provided at the external side of the sleeper.

A sleeper compartment of a railroad passenger car may be a private booth type, comprising sidewalls, partition walls, and two columns of longitudinally arranged sleepers that are parallel with each other; the sleepers of the sleeper compartment are arranged in two layers, which are an upper-sleeper layer and a lower-sleeper layer; the two columns of the longitudinally arranged sleepers are formed by joining no less than two sleepers, with one of the partition walls provided between adjacent sleepers; the length direction of the longitudinally arranged sleepers is consistent with the length direction of the railroad passenger car.

Preferably, the upper-sleeper is movably connected to one of the sidewalls; the lower-sleeper is formed by jointing two parts together.

Preferably, each pair of corresponding upper-sleeper and lower-sleeper form a private booth compartment that comprises a sliding door made of semi-transparent frost glass.

Preferably, in the middle of the two columns of the longitudinally arranged sleepers a corridor is provided in a recess arc structure at each of the partition walls.

Preferably, a roof of the corridor is an arc roof, and an LED cord is provided inside the roof.

The present invention has the following advantageous effects: a sleeper structure that is arranged along the car direction enables the car load to be evenly distributed and the car to travel stably, thereby reducing the dynamic load during travelling; the lower-sleeper is exchangeable with a sofa, such that a passenger may lie down to rest at night and sit on the sofa for rest at daytime, thereby satisfying two rest demands of sitting and lying down. This design is passenger friendly and has a good travelling comfort and practicality.

DETAILED DESCRIPTION OF THE INVENTION

Hereinafter, the content of the present invention will be described with reference to the accompanying drawings. The following depiction is only illustrative and interpretive, which should not play any limiting role to the protection scope of the present invention.

Figure 1:
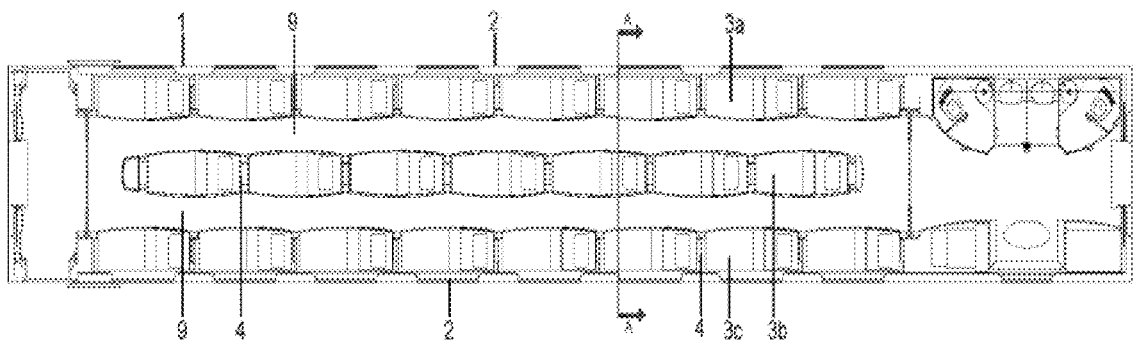
FIG. 1 is a plane layout diagram of an open compartment.
Figure 2:
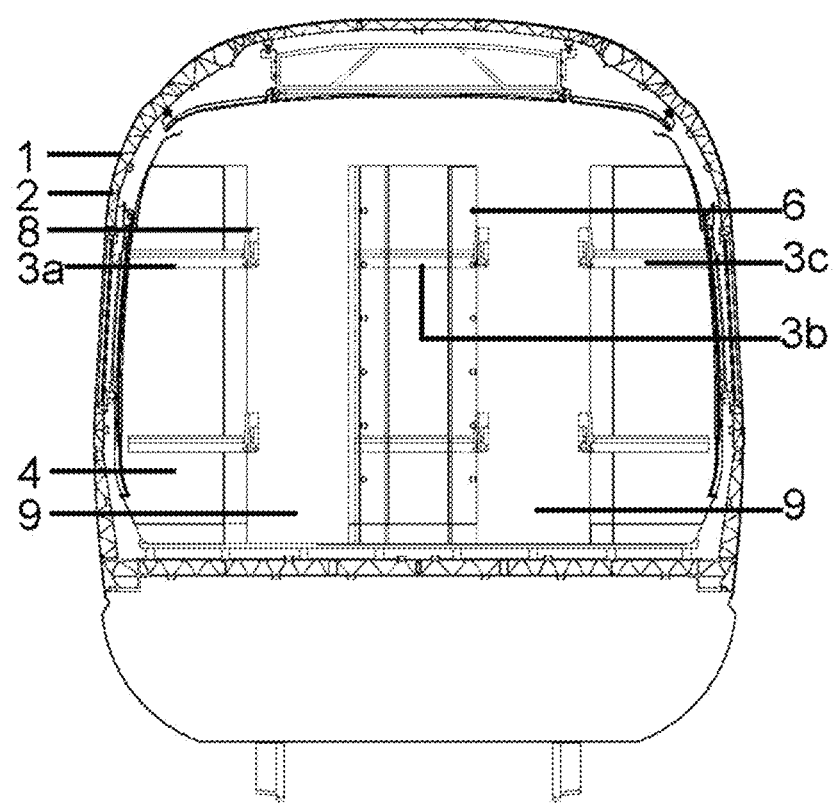
FIG. 2 is an A-A sectional view of an open compartment.

Embodiment 1: a sleeper compartment 1 as illustrated in FIG. 1 and FIG. 2, which is an open type, comprises sidewalls 2, partition walls 4, and three parallel columns of longitudinally arranged sleepers 3a, 3b, 3c, wherein the three parallel columns of the longitudinally arranged sleepers comprise two columns of the longitudinally arranged sleepers 3a, 3c disposed at two sides of the compartment and a middle column of the longitudinally arranged sleeper 3b, each column of the longitudinally arranged sleepers is formed by joining no less than two sleepers; the length direction of the longitudinally arranged sleepers is consistent with the length direction of the car, the external long sides of the longitudinally arranged sleepers at two sides are fixed to the sidewalls 2 of the compartment, respectively, and each of the partition walls 4 is disposed between two adjacent longitudinal sleepers to form a relatively independent activity space, which protects the privacy of passengers and avoids mutual interference between adjacent passengers. A corridor 9 is provided between two adjacent columns of the longitudinally arranged sleepers.

Figure 3:
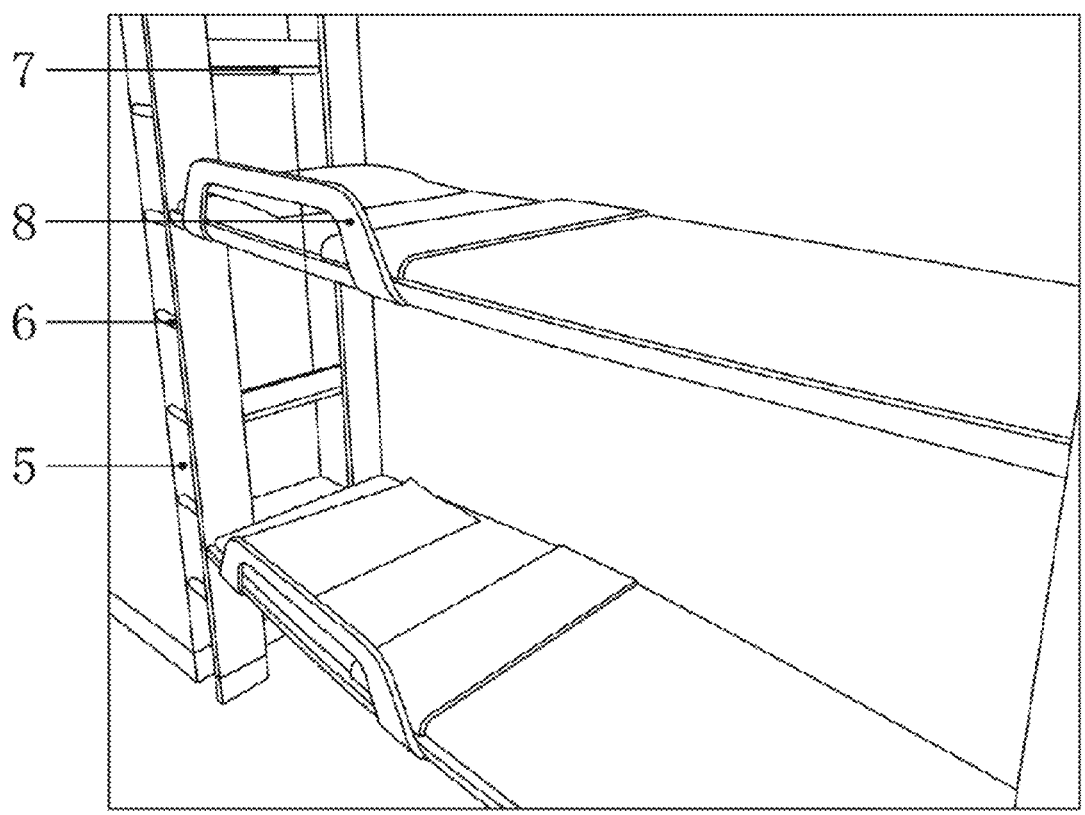
FIG. 3 is a layout diagram of longitudinally arranged sleepers and sidewalls of an open compartment.

As illustrated in FIGS. 2 and 3, at one side of one partition wall 4 of the sleeper compartment 1, which side is close to the corridor 9, is provided with a long recess 5 that is vertical to the floor, inside the recess 5, embedded rungs 6 are provided to provide convenience for passengers to climb on or off the sleeper without occupying much space; this arrangement is artistic and practical. Two adjacent middle longitudinally arranged sleepers 3b of the sleeper compartment 1 are fixed on a partition wall 4 between the two sleepers, inside the partition wall 4 and at the location close to the sleeper head is mounted with a sleeper head lamp 7, at the external side of each sleeper is movably mounted with a turnover handrail 8. At the end of the middle longitudinally arranged sleeper 3b of each open-type sleeper compartment 1, which is close to an end wall of the car body, is provided with a fire extinguisher box and an electric boiler case, without a necessity of separately providing a booth, thereby utilizing the space reasonably.

Figure 4:
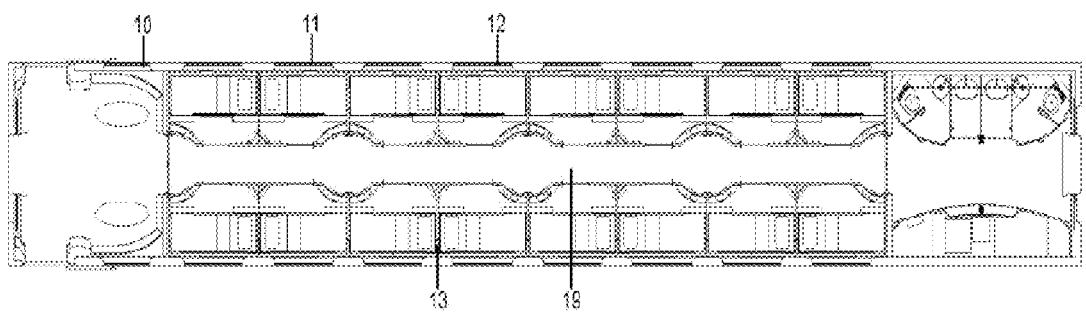
FIG. 4 is an unfolded plane view of sleepers of a private booth-type compartment.
Figure 7:
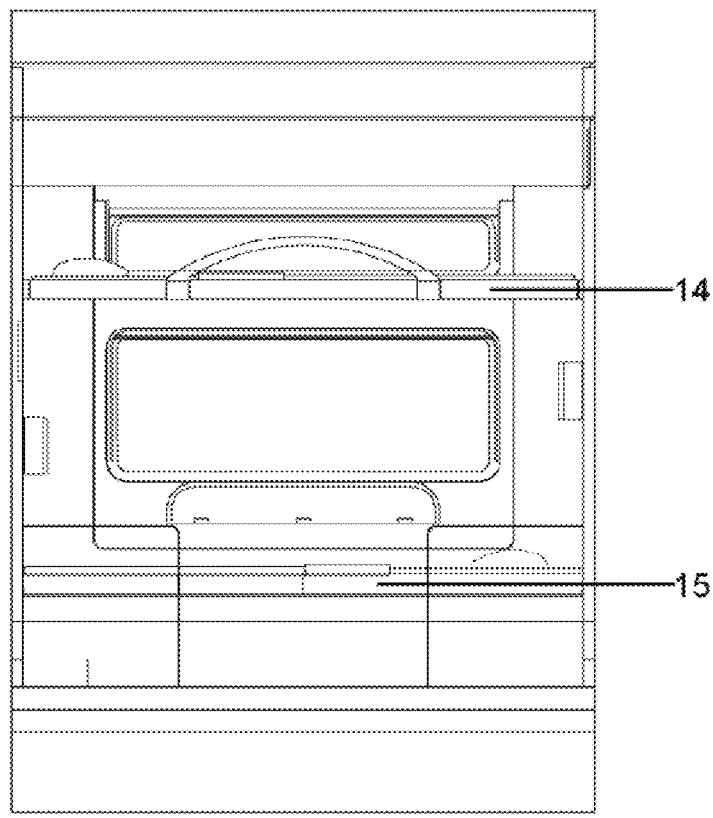
FIG. 7 is a diagram of implementing conversion of a sofa into an upper-sleeper and a lower-sleeper in a private booth-type sofa.

Embodiment 2: a sleeper compartment 10 as illustrated in FIG. 4, which is a private booth type, comprises sidewalls 12, partition walls 13, and two parallel columns of the longitudinally arranged sleepers 11. The sleepers of the sleeper compartment are arranged in two layers, which are an upper-sleeper 14 and a lower-sleeper 15, as shown in FIG. 7. The two columns of the longitudinally arranged sleepers are formed by joining no less than two sleepers, and one partition wall 13 is provided between two adjacent two sleepers; the length direction of the longitudinally arranged sleepers is consistent with the length direction of the railroad passenger car, the longitudinally arranged sleepers at the two sides are joined to the two sidewalls of the compartment respectively, and a corridor 19 is provided between the two columns of the longitudinally arranged sleepers.

Figure 5:
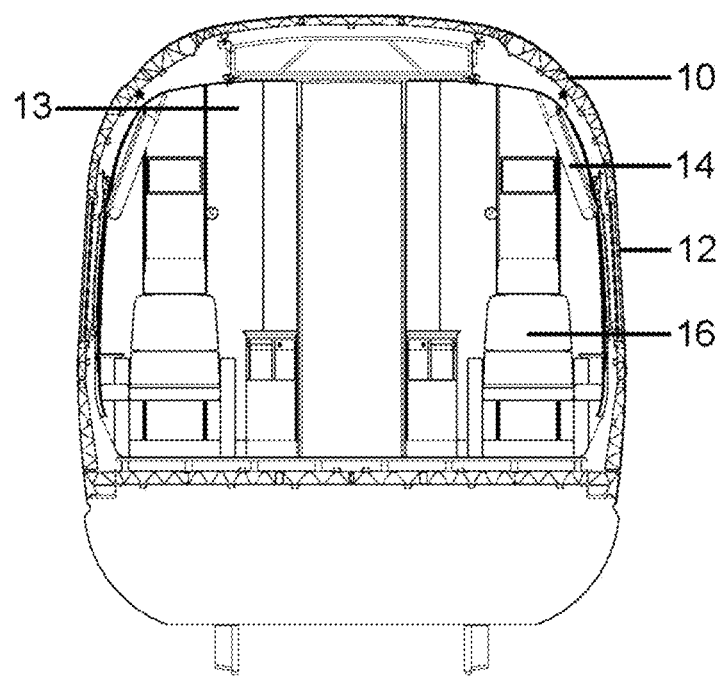
FIG. 5 is a sectional view of a compartment with the sleepers of a private booth-type compartment folded.
Figure 6:
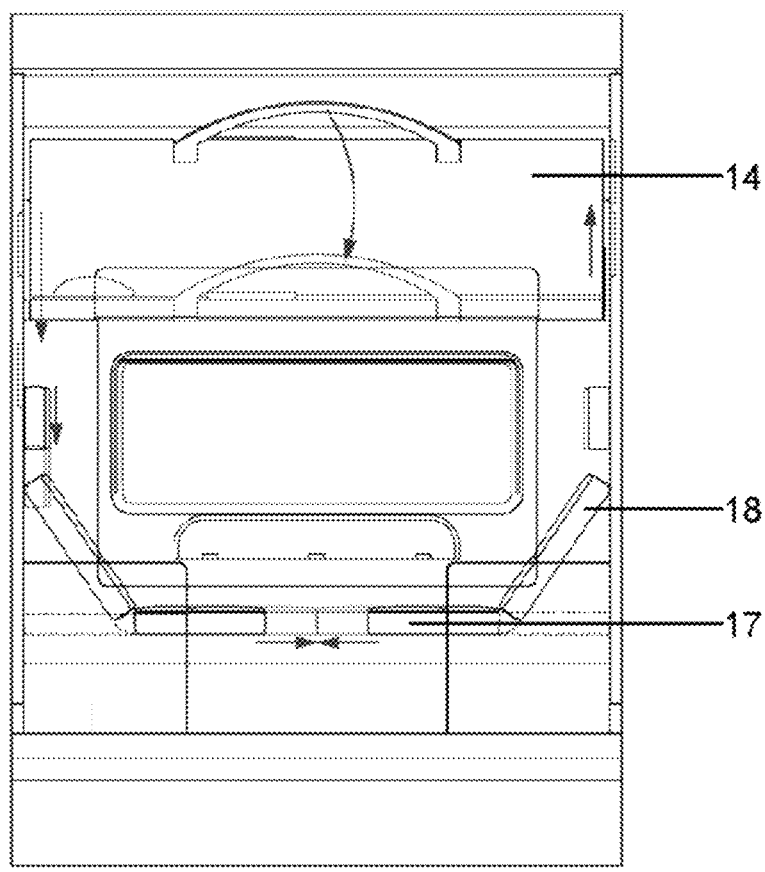
FIG. 6 is a schematic diagram of a process of turning an upper-sleeper and folding a lower-sleeper in a private booth-type compartment.

As illustrated in FIG. 5, the upper-sleeper 14 inside the sleeper compartment 10 may turn upward around an axis connected to a sidewall, beneath the upper-sleeper 14, two sofas 16 that are arranged face to face are provided. As illustrated in FIG. 6, cushions 17 of the two sofas 16 may relatively slide toward the middle, such that the back cushions of the sofas 16 recline accordingly till being flat. At this point, the cushions 17 and the back cushions 18 of the two sofas form a plane, thereby converting into the lower-sleeper 15 as illustrated in FIG. 7. Each pair of corresponding upper-sleeper and lower-sleeper form a private booth. Inside the private booth a TV, a storage cabinet with a lock, a sleeper head lamp, and a side table beneath the window are provided, thereby greatly enhancing the travelling comfort and convenience for passengers.

Figure 8:
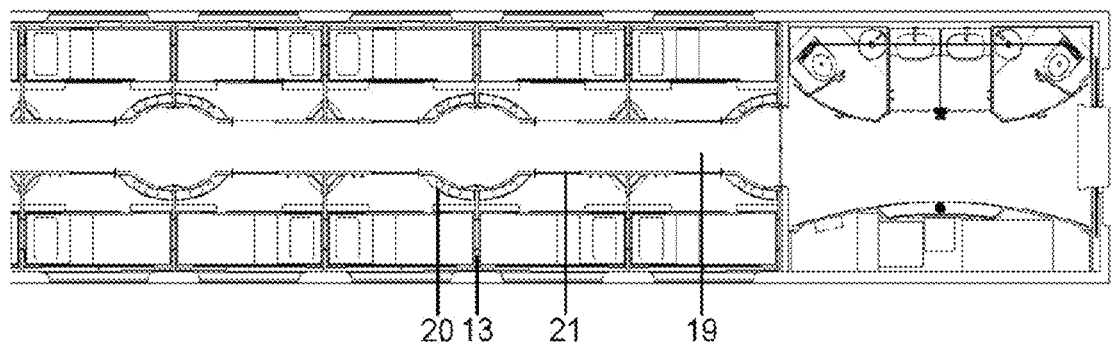
FIG. 8 is a partially enlarged planar view of a private booth-type compartment.

As illustrated in FIG. 8, a middle corridor 19 of the sleeper compartment is designed into an arc 20 shape that is recessed inwardly toward the private booth, such that passengers coming from opposite positions dodge there; the private booth has a sliding door 21 made of semi-transparent frost glass. At the daytime, the light may be transmitted to the corridor through the window (i.e., the frost glass sliding door) to enhance the corridor lighting. The roof of the corridor is designed into an arc roof, with LED cords hidden therein.

What is claimed is:

1. A sleeper compartment of a railroad passenger car, comprising: sidewalls of the compartment, partition walls, and longitudinally arranged sleepers, the length direction of the longitudinally arranged sleepers consistent with the length direction of the railroad passenger car, characterized in that inside the compartment are provided at least two parallel columns of the parallel longitudinally arranged sleepers, the longitudinally arranged sleepers at two sides are connected to the sidewalls of the compartment respectively, each column of the longitudinally arranged sleepers is formed by joining no less than two sleepers, each of the partition walls is provided between two adjacently joined sleepers, and a corridor is provided between two adjacent columns of longitudinally arranged sleepers, the sleepers in the sleeper compartment are arranged in two layers, which are an upper-sleeper layer and a lower-sleeper layer, an upper-sleeper in the upper-sleeper layer is movably joined to the sidewall, and beneath the upper-sleeper two sofas arranged face to face are provided which can slide toward middle to form a lower-sleeper in the lower-sleeper layer.

2. The sleeper compartment of a railroad passenger car according to claim 1, characterized in that inside the compartment three parallel columns of the longitudinally arranged sleepers are provided, wherein the longitudinally arranged sleepers at two sides are connected to the sidewalls of the compartment respectively, one column of the longitudinally arranged sleepers is arranged in the middle of the compartment; and the longitudinally arranged sleepers in the middle are fixed to the partition walls.

3. The sleeper compartment of a railroad passenger car according to claim 2, characterized in that a recess is provided in each of the partition walls close to the corridor side, and inside the recess embedded rungs are provided.

4. The sleeper compartment of a railroad passenger car according to claim 2, characterized in that a fire extinguisher box and an electric boiler case are provided at an end of the longitudinally arranged sleeper, close to an end wall of the compartment, in the middle of the sleeper compartment.

5. The sleeper compartment of a railroad passenger car according to claim 2, characterized in that a sleeper head lamp is provided at a location inside each of the partition walls and close to the sleeper head, and a turnover handrail is provided at the external side of the sleeper.

6. The sleeper compartment of a railroad passenger car according to claim 1, characterized in that inside the compartment two parallel columns of the longitudinally arranged sleepers are provided, each pair of corresponding upper-sleeper and lower-sleeper form a private booth.

7. The sleeper compartment of a railroad passenger car according to claim 6, characterized in that the private booth comprises a sliding door made of semi-transparent frost glass.

8. The sleeper compartment of a railroad passenger car according to claim 6, characterized in that a corridor is provided between two columns of the longitudinally arranged sleepers, and the corridor is provided as an arc structure that is recessed inwardly toward the private booth at the partition wall.

9. The sleeper compartment of a railroad passenger car according to claim 6, characterized in that a roof of the corridor is an arc roof with LED cords inside.

* * * * *